United States Patent Office 3,585,160
Patented June 15, 1971

3,585,160
POLYMER HAVING PENDENT AMINO ACRYLATE GROUPS AND PENDENT OXAZOLINE ESTER GROUPS USEFUL FOR FORMING COATING COMPOSITIONS
Lester I. Miller and Aloysius N. Walus, Flint, Mich., assignors to E. I. du Pont de Nemours and Company, Wilmington, Del.
No Drawing. Filed Apr. 21, 1969, Ser. No. 818,073
Int. Cl. C08f 21/04, 33/00
U.S. Cl. 260—22
15 Claims

ABSTRACT OF THE DISCLOSURE

A novel polymer useful for forming coating compositions and a process for making this polymer are the subjects of this invention; the novel polymer has a backbone of polymerized ethylenically unsaturated monomers and containing in the backbone polymerized vinyl oxazoline ester of the formula

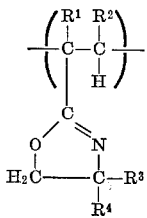

and having attached to its backbone pendent amino ester groups of the formula

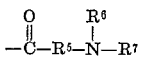

wherein $R^1$, $R^2$, $R^3$, $R^4$, $R^5$, $R^6$ and $R^7$ are hydrocarbon groups; this novel polymer is particularly useful in forming high quality coating compositions that air dry into tough, durable films.

BACKGROUND OF THE INVENTION

This invention relates to a novel polymer and to a process for making the novel polymer and to coating compositions that are formed from the novel polymer. One particular aspect of this invention concerns a pigmented polymeric coating composition that is primarily useful in refinishing autos, trucks, airplanes and the like.

Conventional alkyd resins of drying oils have been modified as shown in Rust et al. U.S. 2,530,315 and 2,530,316, both issued Nov. 14, 1950, and Johnson et al. U.S. 2,964,483, issued Dec. 13, 1960. Synthetic drying oils for coating compositions have been prepared as shown in Koenecke et al. U.S. 2,819,302, issued Jan. 7, 1958, and acrylic resins have been blended and copolymerized to form coating compositions as shown in Gusman U.S. 2,940,950, issued June 14, 1960, and Gusman et al. 2,940,872, issued June 14, 1960. Oxazoline drying oils have been prepared for coating compositions as shown in U.S. 3,248,397, issued Apr. 26, 1966. However, none of these coating compositions form a refinish enamel with the balance of properties required by industry today. The refinish enamels are required by industry to have excellent adherence to the substrate which may be a pigmented primer, uncoated steel, a thermosetting enamel or an acrylic or nitrocellulose lacquer. Also, the refinish enamel must have a relatively short air dry time to a high gloss without buffing or polishing, good gloss retention, good recoatability and repair properties, excellent weatherability and durability. Refinish compositions of the novel polymer of this invention have these characteristics and are acceptable high quality refinish enamels for industry.

SUMMARY OF THE INVENTION

The novel polymer of this invention has a backbone of polymerized ethylenically unsaturated monomer and contains polymerized vinyl oxazoline esters of the formula

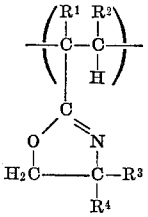

and has attached to the backbone pendent amino ester groups of the formula

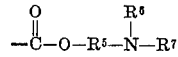

wherein:

$R^1$ is a hydrocarbon group having 2–20 carbon atoms;
$R^2$ is either hydrogen or an alkyl group having 1–4 carbon atoms;
$R^3$ and $R^4$ are individually selected from the group of hydrogen, an alkyl group having 1–4 carbon atoms, and

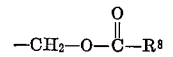

$R^5$ is an aliphatic hydrocarbon group having 1–6 carbon atoms;
$R^6$ and $R^7$ are individually selected from the group of hydrogen, a saturated aliphatic hydrocarbon group having 1–6 carbon atoms;
$R^8$ is a hydrocarbon group having 3–21 carbon atoms.

DESCRIPTION OF THE INVENTION

The vinyl oxazoline polymer of this invention provides a coating composition prepared from this polymer with rapid air drying characteristics and excellent adhesion to substrates, such as primed or unprimed steel, alkyd enamels, alkyd melamine enamels, acrylic lacquers and the like.

The novel polymer preferably has a relative viscosity of about 1.03–1.30, and preferably, a viscosity of about 1.05–1.20. The "relative viscosity" is the value obtained by dividing the efflux time of a solution of the polymer by the efflux time of a solvent used to form the solution. The efflux times are measured according to the procedure of ASTM–D–445–46–T, Method B. Using as the polymer solution 0.25 gram of the polymer in 50 cubic centimeters of ethylene dichloride as the solvent. The efflux times are measured at 25° C. in a standard apparatus, sold under the designation of a modified Ostwald viscometer.

The backbone of the novel vinyl oxazoline polymer can be of any type of copolymerizable ethylenically unsaturated monomers. Typical monomers that can be used are, for example, vinyl chloride, vinylidene chloride, olefins, such as ethylene, propylene and the like; vinyl acetate, conjugated dienes having 4 to 10 carbon atoms, such as butadiene; aromatic hydrocarbons having vinylidene groups such as styrene, alkyl substituted styrene, such as α-methyl styrene; alkyl maleates, such as dibutyl maleate; vinyl pyrrolidone; acrylic esters, such as acrylonitrile and esters of acrylic acid and methacrylic acid, such as methyl methacrylate, ethyl methacrylate, propyl methacrylate, butyl methacrylate, hexyl methacrylate, cyclohexyl methacrylate, 2-ethyl hexyl methacrylate, and the like, methyl acrylate, ethyl acrylate, propyl acrylate, butyl acrylate, hexyl acrylate and the like or mixtures of the aforementioned monomers. One preferred group of monomers are alkyl methacrylate or acrylates having 1–8 carbon atoms in the alkyl group since these polymers form a high quality product. A small amount of ethylenically unsaturated carboxylic acids can also be used in the backbone, such as acrylic acid, methacrylic acid, crotonic acid, itaconic acid, maleic acid and the like.

Particularly useful monomer combinations which form the backbone of the vinyl oxazoline polymer of this invention and which give a high quality polymer are, for example, styrene, methyl methacrylate, 2-ethylhexyl methacrylate, cyclohexyl methacrylate, butyl methacrylate, ethyl acrylate, butyl acrylate, 2-ethylhexyl acrylate, acrylonitrile, and mixtures thereof.

The amino ester groups in the novel vinyl oxazoline polymer of this invention comprise about 0.5–15% by weight of the polymer and are provided by alkyl amino acrylates of the formula

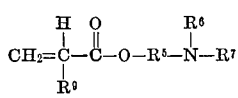

in which:

$R^5$ is an aliphatic hydrocarbon group having 1–6 carbon atoms,
$R^6$ and $R^7$ are either hydrogen, or an aliphatic saturated hydrocarbon group having 1–6 carbon atoms, and
$R^9$ is either hydrogen or methyl.

Typical alkyl amino acrylates or methacrylates that are used to form the novel polymer of this invention are: dimethylaminoethyl methacrylate, diethylaminoethyl methacrylate, dipropylaminoethyl methacrylate, methylethylaminoethyl methacrylate, butylaminoethyl methacrylate, tertiarybutylaminoethyl methacrylate, diethylaminopropyl methacrylate, diethylaminobutyl methacrylate, diethylaminopentyl methacrylate, diethylaminohexyl methacrylate and the like. Preferred are diethylamioethyl methacrylate and tertiarybutylaminoethyl methacrylate, since these compounds form a high quality product and are readily available.

The oxazoline ester of the novel polymer of this invention comprises about 3–35% by weight of the polymer and is provided by the following monomer which is polymerized into the polymer backbone which is of the following formula

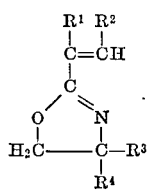

wherein:

$R^1$ is a hydrocarbon group having 2–20 carbon atoms,
$R^2$ is either hydrogen or an alkyl group having 1–4 carbon atoms,
$R^3$ and $R^4$ are either hydrogen or an alkyl group having 1–4 carbon atoms or

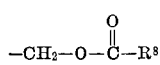

$R^8$ is a hydrocarbon group having 3–21 carbon atoms.

Preferably, $R^1$ $R^8$ are unsaturated aliphatic hydrocarbon groups which are from drying oil fatty acids and $R^2$ is hydrogen. Preferred drying oil fatty acids that are used to prepare the above oxazoline esters are linseed oil fatty acids, tall oil fatty acids and dehydrated castor oil fatty acids.

These oxazoline esters can be made according to Purcell U.S. Pat. 3,248,397, issued Apr. 26, 1966. One preferred compound of this type is a reaction product of 1 mol of tris(hydroxymethyl)-amino methane and 3 mols of tall oil fatty acids which is subsequently reacted with formaldehyde. This compound is currently sold under the trademark of "Chemacoil TA 100." Another preferred compound is made as above except linseed oil fatty acids are substituted for the tall oil fatty acids.

The process for making the novel polymer of this invention comprises blending in a typically useful solvent about 3–35% of the aforementioned vinyl oxazoline ester, 0.5–15% of an alkyl amino acrylate or methacrylate and about 50–96.5% by weight of copolymerizable ethylenically unsaturated monomers. This mixture is then reacted at about 50–200° C. for about 1–6 hours to form a polymer which has a relative viscosity in the aforementioned range of 1.03–1.30.

The following are typically useful solvents that can be used in the process or can be subsequently used to dilute the polymer composition to form a paint composition: acetone, methyl ethyl ketone, amyl alcohol, "Cellosolve" acetate, ethyl acetate, ethyl alcohol, isopropanol, ethylene dichloride, diacetone alcohol, diisobutyl ketone, cyclohexanone, amyl acetate, butyl "Cellosolve," furfural, petroleum naphtha, toluene, xylene, substituted benzene, benzene, substituted toluene, hexane, aromatic hydrocarbons, high boiling petroleum naphthas, high solvency petroleum hydrocarbons, diethyl ether, methyl amyl acetate, butanol and the like. Useful coating compositions contain about 95–40% of one of the above organic solvents and about 5–60% by weight of a film-forming polymer.

Preferred polymerization catalysts that are used to prepare the novel vinyl oxazoline polymers of this invention are azo type catalysts, such as azobisisobutyronitrile and the like. The amount of catalyst used preferably is about 0.01–2% by weight based on the weight of the monomers.

Preferably, coating compositions prepared from the novel vinyl oxazoline polymer of this invention containing about 1–95% by weight of these vinyl oxazoline polymers and 99–5% by weight of an alkyd resin, more preferably, these coating compositions contain 50–65% by weight of the novel vinyl oxazoline polymer and correspondingly 50–35% by weight of an alkyd resin or an acrylic resin.

The alkyd resin used to prepare a coating composition from the novel polymer of this invention has an acid number of about 2–25, and preferably, about 5–14, and is about 5–7 acid number units from the gel point of the alkyd resin.

These alkyd resins are of the typical type which are the esterification product of a drying oil fatty acid, such as linseed oil and tall oil fatty acid, dehydrated castor oil, a polyhydric alcohol, a dicarboxylic acid and an aromatic monocarboxylic acid.

Typical polyhydric alcohols that can be used to prepare the alkyd resin used in this invention are glycerine, pentaerythritol, trimethylol ethane, trimethylol propane, glycols, such as ethylene glycol, propylene glycol, butane diol, pentane diol and the like.

Typical dicarboxylic acids or anhydrides that can be used to prepare the alkyd resin are phthalic acid, phthalic anhydride, isophthalic acid, terephthalic acid, maleic, fumaric and the like. Typical monocarboxylic aromatic acids are benzoic acid, paratertiary butylbenzoic acid, phenol acetic acid, triethyl benzoic acid and the like.

One preferred alkyd resin is a reaction product of an acrylic polymer and an alkyd resin. The alkyd resin portion of the polymer can be of any of those described above while the acrylic portion of the polymer is an ester of acrylic acid or methacrylic acid, acrylonitrile and can contain styrene and also contains a small amount, i.e., 0.5–5%, of an ethylenically unsaturated monocarboxylic or dicarboxylic acid, such as methacrylic acid, acrylic acid, itaconic acid, and the like. The acrylic ester portion of the polymer is prepared initially and is then blended and reacted with the alkyd resin in the early stage of the alkyd resin preparation. The polymer is then formed by using conventional polymerization techniques. One preferred polymer of this type is a styrene, methyl methacrylate, methacrylic acid and the alkyd portion is of a linseed oil fatty acid, benzoic acid, pentaerythritol and phthalic anhydride.

An acrylic resin can also be used to form the novel coating composition of this invention. The acrylic resin preferably has a relative viscosity, measured as described above, of about 1.02–1.06. The acrylic resin can be of esters of acrylic or methacrylic acid, acrylonitrile, an aromatic hydrocarbon having $\alpha$-$\beta$ vinyl unsaturation, such as styrene or mixtures thereof. The acrylic resin can also contain hydroxyalkyl methacrylate or acrylate, such as hydroxyethyl acrylate or hydroxypropyl methacrylate. Also, small amounts of an $\alpha$-$\beta$ unsaturated carboxylic acid, such as acrylic acid or methacrylic acid, can be used in the acrylic resin. One preferred acrylic resin is of styrene, butyl acrylate, hydroxyethyl acrylate and acrylic acid.

Preferably, the novel coating composition of this invention is pigmented and contains pigment in a pigment to binder ratio of about 1:100 to about 75:100. The term "binder" refers to the film-forming constituents in the novel coating composition. Examples of the great variety of pigments which are used in the novel coating composition of this invention are metallic oxides, preferably titanium dioxide, zinc oxide, and the like, metal hydroxides, metal flakes, such as aluminum flake or bronze flake, chromates, such as lead chromate, sulfides, sulfates, carbonates, carbon black, silica, talc, china clay, organic dyes and lead, iron blues, organic reds, maroons, and the like, organic dyes and lakes, etc.

The pigments can be introduced into the coating composition by first forming a mill base with the alkyd resin or the novel polymer of this invention by conventional sand-grinding or ball mill techniques, and then blending the mill base with the film-forming polymers as shown in the following examples.

Plasticizers in amounts up to 10% by weight, based on the weight of binder can be used in the novel composition of this invention. Plasticizers that can be used are benzyl-butyl phthalate, dibutyl phthalate, triphenyl phosphate, 2-ethylhexylbenzyl phthalate, dicyclohexyl phthalate, diallyl phthalate, dibenzyl phthalate, butylcyclohexyl phthalate, mixed benzoic acid and fatty oil acid esters of pentaerythritol, poly(propylene adipate) dibenzoate, diethylene glycol dibenzoate, tetrabutylthiodisuccinate, butyl phthalyl butyl glycolate, acetyltributyl citrate, dibenzyl sebacate, tricresyl phosphate, toluene ethyl sulfonamide, the di-2-ethyl-hexyl ester of hexamethylene diphthalate, di(methylcyclohexyl)phthalate. One preferred plasticizer of this group is benzyl butyl phthalate since it forms a coating with excellent balance of properties.

Small amounts of conventional metallic driers are used in the novel coating composition, such as lead naphthanate, manganese naphthanate, cobalt naphthanate, lead tallate and the like. The novel coating compositions of this invention can be applied to a variety of substrates, for example, metal, wood, glass, plastics and the like, by any of the usul application methods, such as spraying, electrostatic spraying, dipping, brushing, flow coating and the like. These coatings can be air dried or baked at a relatively low temperature of about 65–120° C. for about 15 minutes–2 hours. The resulting coating is about 1–5 mils thick, preferably 2–4 mils thick, and has good gloss and can be rubber or polished in accordance with conventional techniques, if desired, to improve smoothness or apparent gloss or both. The novel coating composition of the invention gives a hard, durable, scratch resistant, weather resistant, glossy coating which is suitable for auto bodies, truck bodies, repair of auto bodies and truck bodies, airplanes, railroad equipment, appliances, vending machines, outdoor equipment and the like.

Another unique characteristic of the novel coating composition of this invention is that the coating, after application and a short air dry or bake period, can be recoated or a second color can be applied for two-toning without lifting. This characteristic makes it easy to repair and recoat with a second coat.

The rapid air dry to a glossy finish and the excellent adhesion to substrates are the characteristics of the coating composition of this invention that make it particularly useful for repair and refinish of autos and trucks. Also, the novel coating composition is suitable for repairing all types of coating metal substrates, such as metals coated with acrylic lacquers, nitrocellulose lacquers, alkyd- melamine paints and the like.

The examples illustrate the invention. All quantities shown are on a weight basis unless otherwise indicated.

EXAMPLE 1

Preparation of acrylic-vinyl oxazoline ester polymer

| | Parts by wt. |
|---|---|
| Portion 1: | |
| Toluene | 176.0 |
| Acetone | 84.8 |
| Portion 2: | |
| Methyl methacrylate | 169.5 |
| Butyl methacrylate | 213.2 |
| Tertiary butylaminoethyl methacrylate | 29.1 |
| Vinyl oxazoline ester of a linseed oil fatty acid (reaction product of 1 mole of tris-(hydroxymethyl)-aminomethane with 3 moles of linseed oil fatty acids which is subsequently reacted with 1 mole of formaldehyde using the process of U.S. Pat. 3,248,397, issued Apr. 26, 1966) | 72.6 |
| Azobisisobutyronitrile | 3.6 |
| Portion 3: | |
| Azobisisobutyronitrile | 1.2 |
| Portion 4: | |
| Azobisisobutyronitrile | 1.2 |
| Portion 5: | |
| Azobisisobutyronitrile | 1.2 |
| Portion 6: | |
| Toluene | 62.0 |
| Total | 814.4 |

Portion 1 is charged into a reaction vessel equipped with a reflux condenser and the ingredients are heated to about 70–75° C. Portion 2 is premixed and slowly added at an even and continuous rate to the reaction vessel over a 2-hour period, while maintaining the reaction mixture at its reflux temperature which varies about 70–82° C. The reaction mixture is maintained at its reflux temperature for about 1 hour, and then Portion 3 is added and the reaction is refluxed an additional hour.

Portion 4 is then added and the mixture is again refluxed for an additional hour. Portion 5 is then added and the mixture is refluxed for an additional 2 hours, or until the total polymer solids of the solution reaches at least 63%. The heat is then removed from the reaction vessel and Portion 6 is added.

The resulting polymer solution has a Gardner-Holdt viscosity of X–Z measured at 25° C. and a solids content of about 58%.

The polymer is the reaction product of:

| | Percent by wt. |
|---|---|
| Methyl methacrylate | 35 |
| Butyl methacrylate | 44 |
| Tertiary butylaminoethyl methacrylate | 6 |
| Vinyl oxazoline ester of linseed oil fatty acid | 15 |
| Total | 100 |

The polymer solution is applied to a steel substrate treated with zinc phosphate and is dried for about 1 hour.

The resulting clear coating has an excellent appearance and is smooth, tough and durable.

An alkyd resin is prepared as follows:

| Portion 1: | Parts by wt. |
|---|---|
| Linseed oil fatty acids | 178.6 |
| Benzoic acid | 59.8 |
| Pentaerythritol | 123.8 |
| Phthalic anhydride | 63.3 |
| Dibutyl tin oxide | 0.6 |
| Xylene | 21.3 |
| Portion 2: | |
| Phthalic anhydride | 68.7 |
| Xylene | 2.8 |
| Portion 3: | |
| Xylene | 350.5 |
| Total | 869.4 |

The ingredients of Portion 1 are premixed and charged into a reaction vessel equipped with a reflux condenser and heated to the reflux temperature which is about 166° C. The reaction mixture is maintained at its reflux temperature which may rise to about 218° C. The samples of the reaction mixture are taken periodically to determine the acid number by conventional techniques. When an acid number of about 5–10 is reached, Portion 2 is then added and the reaction mixture is brought back to its reflux temperature which is about 205° C., and the reaction is continued until the polymer attains an acid number of about 10–12. When the aforementioned acid number is reached, Portion 3 is charged into the reaction vessel.

The resulting polymer solution has a polymer solids of about 55% by weight and the polymer has a Gardner-Holdt viscosity of about V–Z measured at 25° C.

The polymer is the esterification product of:

| | Percent by wt. |
|---|---|
| Linseed oil fatty acids/pentaerythritol | 41.6 |
| Pentaerythritol benzoate | 15.0 |
| Pentaerythritol phthalate | 39.4 |
| Pentaerythritol | 4.0 |
| Total | 100.0 |

| Formula 1 pigment dispersion: | Parts by wt. |
|---|---|
| Titanium dioxide pigment (sulfate process) | 630.0 |
| Soya glycerol phthalate alkyd resin solution (55% resin solids in which the alkyd is of 43% soya oil, 52% glycerol phthalate, 5% glycerin) | 158.0 |
| Xylene | 212.0 |
| Total | 1000.0 |

The ingredients were premixed and charged into a conventional sand-grinding mill and ground to about a 0.3 mil fineness.

A paint composition was formed by mixing the following ingredients.

| Portion 1: | Parts by wt. |
|---|---|
| Formula 1 pigment dispersion (63% titanium dioxide dispersed in the soya oil alkyd resin and hydrocarbon solvent) | 188.02 |
| Soya glycerol phthalate alkyd resin solution (55% resin solids, alkyd described in Formula 1 pigment dispersion) | 26.10 |
| Alkyd resin solution prepared above (55% resin-solids) | 136.90 |
| Acrylic-vinyl oxazoline polymer solution prepared above (58% polymer solids) | 302.59 |
| Cobalt naphthanate drier solution (6% cobalt in a hydrocarbon solvent) | 2.68 |
| Manganese naphthanate drier solution (6% manganese in a hydrocarbon solvent) | 0.28 |
| Lead tallate drier solution (24% lead in a hydrocarbon solvent) | 2.68 |

| Portion 1: | Parts by wt. |
|---|---|
| Hydrocarbon solvent (boiling point 189–219° C., aniline point 28° C.) | 34.43 |
| Naphtha solvent (boiling point 100–163° C.) | 79.56 |
| Portion 2: | |
| Hydrocarbon solvent (boiling point 150–190° C., aniline point −28° C.) | 79.12 |
| Total | 852.36 |

Portion 1 is mixed for about 1 hour and then Portion 2 is added.

The above paint composition was reduced to a spray viscosity using an aromatic hydrocarbon solvent. A coating of about 2 mils thick of the paint composition was sprayed onto each of the following sets of panels; autobody steel panels which had been primed with pigmented alkyd primer; steel panels coated with an acrylic lacquer; steel panels coated with a pigmented epoxy primer; steel panels coated with a thermosetting acrylic enamel; steel panels coated with an alkyd enamel; steel panels coated with an alkyd melamine enamel. Several of the thermosetting acrylic enamel panels and the alkyd enamel panels and the alkyd melamine panels are sanded and the other panels are unsanded before the paint composition is applied. The paint is allowed to air dry for about 30 minutes and in each case, a tough, durable film having excellent gloss, adhesion and appearance is formed.

Several panels of each of the above sets are air dried for one week and are subjected to a high-humidity-low temperature crack test which consists of 4 cycles. In each cycle, the panels are subject to (1) 100% relative humidity and 100° F. for 24 hours, (2) −10° F. for 24 hours and (3) room temperature for 4 hours. At the completion of each cycle, the panels are examined with a magnifying glass for cracks. At the end of the test, the above panels showed no cracking or dulling and no loss in adhesion to the substrate.

Several panels of each of the above sets are exposed in Florida at a 45° angle facing south. The panels are examined after 4 and 8 months. After 8 months of weathering, each of the panels showed good color retention, excellent gloss, very little chalking and water spotting, and no loss of adhesion to the substrate.

The above tests indicate that the novel paint composition of this invention is an excellent coating for metals and adheres to most types of substrates even under severe conditions.

EXAMPLE 2

An acrylic/vinyl oxazoline ester is prepared as follows.

| Portion 1: | Parts by wt. |
|---|---|
| Toluene | 176.0 |
| Acetone | 84.8 |
| Portion 2: | |
| Methyl methacrylate | 169.5 |
| Butyl methacrylate | 213.2 |
| Dimethylaminoethyl methacrylate | 29.1 |
| Vinyl oxazoline ester of tall oil fatty acids (prepared as in Example 1, except tall oil fatty acids are used instead of linseed oil fatty acids) | 72.6 |
| Azobisisobutyronitrile | 3.6 |
| Portion 3: | |
| Azobisisobutyronitrile | 1.2 |
| Portion 4: | |
| Azobisisobutyronitrile | 1.2 |
| Portion 5: | |
| Azobisisobutyronitrile | 1.2 |
| Portion 6: | |
| Toluene | 62.0 |
| Total | 814.4 |

Portion 1 is charged into a reaction vessel equipped with a reflux condenser and the ingredients are heated to about 70–75° C. Portion 2 is premixed and slowly added at an even and continuous rate to the reaction vessel over a 2-hour period, while maintaining the reaction mixture at its reflux temperature which varies about 70–82° C. The reaction mixture is maintained at its reflux temperature for about 1 hour, and then Portion 3 is added and the reaction is refluxed an additional hour. Portion 4 is then added and the mixture is again refluxed for an additional hour. Portion 5 is then added and the mixture is refluxed for an additional 2 hours, or until the total polymer solids of the solution reaches at least 63%. The heat is then removed from the reaction vessel and Portion 6 is added.

The resulting polymer solution has a Gardner-Holdt viscosity of X–Z measured at 25° C. and a solids content of about 58%.

The polymer is the polymerization product of the following ingredients:

| | Parts by wt. |
|---|---|
| Methyl methacrylate | 35 |
| Butyl methacrylate | 44 |
| Diethylaminoethyl methacrylate | 6 |
| Vinyl oxazoline ester of tall oil fatty acids | 15 |
| Total | 100 |

The polymer solution is applied to a steel substrate treated with zinc phosphate and is dried for about 1 hour. The resulting clear coating has an excellent appearance and is smooth, tough and durable.

A paint composition is formulated by blending the following ingredients:

Portion 1: Parts by wt.
| | |
|---|---|
| Formula 1 pigment dispersion (63% titanium dioxide dispersed in a soya oil alykd resin and hydrocarbonsolvent described in Example 1) | 188.02 |
| Soya glycerol phthalate alkyd resin solution (55% solids in a hydrocarbon solution as described in Example 1) | 26.10 |
| Alkyd resin solution (55% solids, prepared in Example 1) | 136.90 |
| Acrylic-vinyl oxazoline tall oil fatty acid Acrylic-vinyl oxazoline tall oil fatty acid ester solution (58% solids, prepared above) | 302.59 |
| Cobalt naphthanate drier solution (6% cobalt in a hydrocarbon solvent) | 2.68 |
| Manganese naphthanate drier solution (6% manganese in a hydrocarbon solvent) | 0.28 |
| Lead tallate drier solution (24% lead in a hydrocarbon solvent) | 2.68 |
| Hydrocarbon solvent (boiling point 189–219° C., aniline point 28° C.) | 34.43 |
| Naphtha solvent, (boiling point 100–163° C.) | 79.56 |

Portion 2:
| | |
|---|---|
| Hydrocarbon solvent (boiling point 150–190° C. aniline point 28° C.) | 79.12 |
| Total | 846.72 |

Portion 1 is mixed for about 1 hour than Portion 2 is added and thoroughly mixed.

The resulting paint composition is reduced to a spray viscosity with an aromatic hydrocarbon solvent and sprayed onto sets of steel panels coated as in Example 1 and allowed to air dry for about 30 minutes. The resulting films in each case had excellent adhesion to the various substrates, had high gloss, excellent appearance, excellent durability, excellent crack resistance to high humidity temperature cycles when subjected to the tests as in Example 1 and excellent recoatability.

EXAMPLE 3

A paint composition is formulated by mixing the following ingredients:

| | Parts by wt. |
|---|---|
| Formula 1 pigment dispersion (described in Example 1—63% TiO$_2$ dispersed in soya oil alkyd resin and hydrocarbon solvent) | 28.12 |
| Cobalt naphthanate drier solution (6% cobalt in in a hydrocarbon solvent) | 0.40 |
| Manganese naphthanate drier solution (6% manganese in a hydrocarbon solvent) | 0.30 |
| Lead tallate drier solution (24% lead in a hydrocarbon solvent) | 0.30 |
| Acrylic-vinyl oxazoline polymer solution (prepared in Example 1—58% polymer solids) | 43.15 |
| Acrylic polymer solution (6% polymer solids in a hydrocarbon solvent in which the polymer is styrene/butyl acrylate/hydroxyethyl acrylate/acrylic acid weight ratio of 45/43/8/4) | 3.32 |
| Hydrocarbon solvent (boiling point 150–190° C., aniline point 28° C.) | 24.41 |
| Total | 100.00 |

The resulting paint composition is reduced to a spray viscosity with an aromatic hydrocarbon solvent and sprayed onto sets of steel panels coated as in Example 1 and allowed to air dry for about 30 minutes. The resulting films in each case had excellent adhesion to the various substrates, had an excellent appearance and excellent durability.

EXAMPLE 4

Preparation of an acrylic-vinyl oxazoline ester polymer.

Portion 1: Parts by wt.
| | |
|---|---|
| Toluene | 727 |
| Acetone | 350 |

Portion 2:
| | |
|---|---|
| Styrene | 1000 |
| Methyl methacrylate | 300 |
| Acrylonitrile | 280 |
| Tert-butylaminoethyl methacrylate | 120 |
| Vinyl oxazoline ester of linseed oil fatty acid described in Example 1) | 300 |
| Azobisisobutyronitrile | 15 |

Portion 3:
| | |
|---|---|
| Azobisisobutyronitrile | 5 |

Portion 4:
| | |
|---|---|
| Azobisisobutyronitrile | 5 |

Portion 5:
| | |
|---|---|
| Azobisisobutyronitrile | 5 |

Portion 6:
| | |
|---|---|
| Azobisisobutyronitrile | 5 |

Portion 7:
| | |
|---|---|
| Toluene | 256 |

Portion 8:
| | |
|---|---|
| Azobisisobutyronitrile | 5 |

Portion 9:
| | |
|---|---|
| Toluene | 304 |
| Total | 3677 |

Portion 1 is charged into a reaction vessel equipped with a reflux condenser and the ingredients are heated to about 70–75° C. Portion 2 is premixed and slowly added at an even and continuous rate over a 2-hour period while maintaining the reaction mixture at its reflux temperature. The reaction mixture is maintained at its reflux temperature for one hour and Portion 3 is added. The reaction mixture is then refluxed for another hour and Portions 4, 5 and 6 are similarly added with the reaction mixture being refluxed for about 1 hour between additions. Portion 7 is then added and the reaction mixture is heated to its reflux temperature. Portion 8 is then added and the mixture is refluxed for about 1½ hours. The reaction mixture is then cooled and Portion 9 is added.

The resulting polymer solution has a Gardner-Holdt viscosity of Z 2-¼, a polymer solids content of about 53.0% and a relative viscosity of about 1.166 at 25° C. according to ASTM-D-445-46-T, Method B.

The resulting polymer is the reaction product of:

|  | Percent by wt. |
|---|---|
| Styrene | 50 |
| Acrylonitrile | 14 |
| Methyl methacrylate | 15 |
| Tert-butylaminoethyl methacrylate | 6 |
| Vinyl oxazoline ester of linseed oil fatty acids | 15 |
| Total | 100 |

The above prepared polymer solution is applied to a steel substrate treated with zinc phosphate and dried for one hour. The resulting clear coating has an excellent appearance and is smooth and durable.

A paint composition is formulated using the identical constituents as to prepare the paint composition of Example 1 except the above prepared acrylic vinyl oxazoline polymer solution was used instead of the acrylic-vinyl oxazoline polymer solution of Example 1.

The resulting paint composition is reduced to a spray viscosity as in Example 1 and applied to steel panels primed with a pigmented alkyd resin primer and steel panels coated with an alkyd enamel. The panels are air dried and in each case a tough, durable paint film is formed that has excellent adhesion to the substrate, has a good appearance, and has excellent tape print resistance and recoatability.

EXAMPLE 5

Preparation of acrylic-vinyl oxazoline ester polymer.

| Portion 1: | Parts by wt. |
|---|---|
| Toluene | 2280 |
| Acetone | 680 |
| Styrene | 1375 |
| Butyl methacrylate | 2970 |
| Tert-butylaminoethyl methacrylate | 330 |
| Vinyl oxazoline ester of a linseed oil fatty acid (described in Example 1) | 825 |
| Azobisisobutyronitrile | 11 |
| Portion 2: | |
| Azobisisobutyronitrile | 88 |
| Total | 8559 |

Portion 1 is premixed and charged into a reaction vessel equipped with a reflux condenser and the ingredients are heated at the reflux temperature of about 95° C. for about 1 hour. Portion 2 is divided into eight equal portions and while maintaining the reaction mixture at its reflux temperature, each portion is successively added in 45-minute intervals.

The resulting polymer solution has a solids content of 63.9%, a Gardner-Holdt viscosity of Z1 and a relative viscosity of 1.1 both measured at 25° C.

The polymer is the reaction product of:

|  | Percent by wt. |
|---|---|
| Styrene | 25 |
| Butyl methacrylate | 54 |
| Tert-butylaminoethyl methacrylate | 6 |
| Vinyl oxazoline ester of a linseed oil fatty acid | 15 |
| Total | 100 |

The above prepared polymer solution is applied to a steel substrate treated with zinc phosphate and dried for one hour. The resulting clear coating has an excellent appearance and is smooth and durable.

A paint composition is formulated using the identical constituents as to prepare the paint composition of Example 1 except the above prepared acrylic vinyl oxaoline polymer solution was used instead of the acrylic-vinyl oxazoline polymer solution of Example 1.

The resulting paint composition is reduced to a spray viscosity as in Example 1 and applied to steel panels primed with pigmented alkyd resin primer, and steel panels coated with an alkyd melamine enamel. The panels are air dried and in each case a tough, durable paint film is formed that has excellent adhesion to the substrate, has a good appearance, excellent gloss, and good recoatability characteristics.

EXAMPLE 6

Preparation of an acrylic-vinyl oxazoline ester polymer.

| Portion 1: | Parts by wt. |
|---|---|
| Toluene | 720.0 |
| Isopropanol | 240.0 |
| Ethyl acetate | 240.0 |
| Methyl methacrylate | 990.0 |
| Cyclohexyl methacrylate | 540.0 |
| Tertiary butylaminoethyl methacrylate | 90.0 |
| Vinyl oxazoline ester of linseed oil (described in Ex. 1) | 180.0 |
| Azobisisobutyronitrile | 3.6 |
| Portion 2: | |
| Azobisisobutyronitrile | 18.0 |
| Portion 3: | |
| Toluene | 600.0 |
| Total | 3621.6 |

Portion 1 is premixed and charged into a reaction vessel equipped with a reflux condenser and the ingredients are heated to the reflux temperature of about 85° C. for about 1 hour. Portion 2 is divided into 5 equal portions and each portion is added successively in 45 minute intervals, while the reaction mixture is maintained at its reflux temperature. Portion 3 is then added and the mixture is cooled to room temperature.

The resulting polymer solution has a solids content of 48.5%, a Gardner-Holdt viscosity of Y and the polymer has a relative viscosity of 1.111 both measured at 25° C.

The polymer is the reaction product of:

|  | Percent by wt. |
|---|---|
| Methyl methacrylate | 55 |
| Cyclohexyl methacrylate | 30 |
| Tert. butylaminoethyl methacrylate | 5 |
| Vinyl oxazoline ester of linseed oil fatty acid | 10 |
| Total | 100 |

The above prepared polymer solution is applied to a steel substrate treated with zinc phosphate and dried for one hour. The resulting clear coating has an excellent appearance and is smooth and durable.

A paint composition is formulated using the identical constituents as to prepare the paint composition of Example 1 except the above prepared acrylic vinyl oxazoline polymer solution was used instead of the acrylic-vinyl oxazoline polymer solution of Example 1.

The resulting paint composition is reduced to a spray viscosity as in Example 1 and applied to steel panels primed with a pigmented alkyd resin primer, steel panels coated with an acrylic lacquer, steel panels coated with a pigmented nitrocellulose primer surfacer and steel panels coated with an alkyd melamine enamel. The panels are air dried and in each case a tough, durable paint film is formed that has excellent adhesion to the substrate, has a good appearance, excellent gloss, excellent resistance to tape print and lifting when recoated.

EXAMPLE 7

Preparation of an acrylic-vinyl oxazoline ester polymer.

| Portion 1: | Parts by wt. |
|---|---|
| Toluene | 720.0 |
| Isopropanol | 240.0 |
| Ethyl acetate | 240.0 |
| Methyl methacrylate | 810.0 |
| 2 ethylhexyl methacrylate | 540.0 |
| Tert. butylaminoethyl methacrylate | 90.0 |
| Vinyl oxazoline ester of tall oil fatty acid (described in Ex. 2) | 360.0 |
| Azobisisobutyronitrile | 3.6 |
| Portion 2: | |
| Azobisisobutyronitrile | 18.0 |
| Total | 3021.6 |

Portion 1 is premixed and charged into a reaction vessel equipped with a reflux condenser and the ingredients are heated to the reflux temperature of about 85° C. for 1 hour. Portion 2 is divided into 6 equal portions and each portion is added successively in 45 minute intervals while the reaction mixture is maintained at its reflux temperature.

The resulting polymer solution has a solids content of 58.6% and a Gardner-Holdt viscosity of about Z2 and the polymer has a relative viscosity of 1.092 both measured at 25° C.

The polymer is the reaction product of:

| | Percent by wt. |
|---|---|
| Methyl methacrylate | 45 |
| 2-ethylhexyl methacrylate | 30 |
| Tert. butylaminoethyl methacrylate | 5 |
| Vinyl-oxazoline ester of a tall oil fatty acid | 20 |
| Total | 100 |

The above prepared polymer solution is applied to a steel substrate treated with zinc phosphate and dried for one hour. The resulting clear coating has an excellent appearance and is smooth and durable.

A paint composition is formulated using the identical constitutents as to prepare the paint composition of Example 1 except the above prepared acrylic vinyl oxazoline polymer solution was used instead of the acrylic-vinyl oxazoline polymer solution of Example 1.

The resulting paint composition is reduced to a spray viscosity as in Example 1 and applied to steel panels primed with a pigmented alkyd resin primer, steel panels coated with a thermosetting acrylic enamel, steel panels coated with a pigmented nitrocellulose primer surfacer and steel panels coated with an alkyd melamine enamel. The panels are air dried and in each case a tough, durable paint film is formed that has excellent adhesion to the substrate and has a good appearance.

EXAMPLE 8

Preparation of an acrylic resin.

| Portion 1: | Parts by wt. |
|---|---|
| Xylene | 1637 |
| Portion 2: | |
| Methylmethacrylate monomer | 960 |
| Styrene monomer | 960 |
| Methacrylic acid monomer | 80 |
| Azobisisobutyronitrile | 40 |
| Tertiary butyl perbenzoate | 40 |
| Portion 3: | |
| Tertiary butyl perbenzoate | 7 |
| Portion 4: | |
| Tertiary butyl perbenzoate | 7 |
| Total | 3731 |

Portion 1 is charged into a reaction vessel equipped with a reflux condenser and heated to about 135° C. Portion 2 is premixed and is slowly charged into the reaction vessel over about a 2 hour period. While maintaining the reflux temperature Portion 3 is then added and the reaction mixture is refluxed about 45 minutes. Portion 4 is added and the mixture is refluxed for an additional hour.

The resulting polymer solution has a solids content of about 56.6% and a Gardner-Holdt viscosity of Z4 and the polymer has a relative viscosity of about 1.045.

The acrylic polymer has the following ratio of constituents:

| | Percent by wt. |
|---|---|
| Styrene | 48 |
| Methylmethacrylate | 48 |
| Methacrylic acid | 4 |
| Total | 100 |

Preparation of an acrylic alkyd resin.

| Portion 1: | Parts by wt. |
|---|---|
| Linseed oil fatty acid | 586 |
| Benzoic acid | 196 |
| Pentaerythritol | 407 |
| Acrylic polymer solution (56.6% polymer solids prepared above) | 909 |
| Phthalic anhydride | 188 |
| Dibutyl tinoxide | 2 |
| Portion 2: | |
| Phthalic anhydride | 244 |
| Portion 3: | |
| Xylol | 11 |
| Portion 4: | |
| Xylol | 23 |
| Portion 5: | |
| Xylol | 1509 |
| Total | 4075 |

Portion 1 is premixed and charged into a reaction vessel equipped with a reflux condenser and heated to reflux temperature and held at its reflux temperature until all of the water from the esterification process is removed which requires about 4 hours. Portion 2 is then charged into the reaction mixture and then Portion 3 is added and the reaction mixture is refluxed for about 45 minutes. Portion 4 is slowly added while maintaining the reflux temperature. Portion 5 is then slowly added allowing the reaction mixture to cool.

The resulting polymer solution has a polymer solids of 55.3%, a Gardner-Holdt viscosity of about 7 and the polymer has an acid number of about 16.

The following paint compositions are formulated using the identical constituents as used to form the paint composition of Example 1 except the following substitutions are made:

Paint No. 1

Acrylic-alkyd resin solution prepared above is substituted for the alkyd resin solution used to prepare the paint in Example 1.

Paint No. 2

Acrylic-vinyl oxazoline polymer solution of Example 2 is substituted for the acrylic-vinyl oxazoline polymer of Example 1 and the above prepared acrylic alkyd resin solution is substituted for the alkyd resin solution used to prepare the paint in Example 1.

Paint No. 3

Acrylic-vinyl oxazoline polymer solution of Example 4 is substituted for the acrylic-vinyl oxazoline polymer of Example 1 and the above prepared acrylic alkyd resin solution is substituted for the alkyd resin solution used to prepare the paint in Example 1.

Paint No. 4

Acrylic-vinyl oxazoline polymer solution of Example 5 is substituted for the acrylic-vinyl oxazoline polymer of Example 1 and the above prepared acrylate alkyd resin solution is substituted for the alkyd resin solution used to prepare the paint in Example 1.

Paint No. 5

Acrylic-vinyl oxazoline polymer solution of Example 6 is substituted for the acrylic-vinyl oxazoline polymer of Example 1 and the above prepared acrylic alkyd resin solution is substituted for the alkyd resin solution used to prepare the paint in Example 1.

Paint No. 6

Acrylic-vinyl oxazoline polymer solution of Example 7 is substituted for the acrylic-vinyl oxazoline polymer of Example 1 and the above prepared acrylic alkyd resin solution is substituted for the alkyd resin solution used to prepare the paint in Example 1.

Each of the above paint compositions is reduced to a spray viscosity as in Example 1 and each is applied to a separate set of steel panels each primed with pigmented alkyd resin primer. In each case the paint is air dried and forms a tough, durable film with excellent adhesion to the substrate, has a high quality appearance, good gloss and good recoatability characteristics.

We claim:
1. A polymer consisting essentially of a backbone of about 50–96.5% by weight, based on the weight of the polymer, of polymerized ethylenically unsaturated monomers and containing in the backbone about 3–35% by weight, based on the weight of the polymer, of polymerized vinyl oxazoline esters of the formula

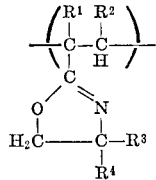

and having attached to the polymer backbone about 0.5–15% by weight, based on the weight of the polymer, of pendent amino ester groups of the formula

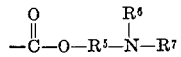

wherein the ethylenically unsaturated monomers are selected from the group consisting of an alkyl methyacrylate having 1–8 carbon atoms in the alkyl group, cyclohexyl methacrylate, acrylonitrile, styrene and mixtures of these monomers;

$R^1$ is a hydrocarbon group having 2–20 carbon atoms;
$R^2$ is selected from the group consisting of hydrogen and an alkyl group having 1–4 carbon atoms;
$R^3$ and $R^4$ are

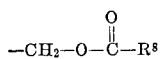

$R^5$ is an aliphatic hydrocarbon group having 1–6 carbon atoms;
$R^6$ and $R^7$ are individually selected from the group consisting of hydrogen, a saturated aliphatic hydrocarbon group having 1–6 carbon atoms; and
$R^8$ is from drying oil fatty acids.

2. The polymer of claim 1 in which the backbone is of methyl methacrylate and butyl methacrylate, $R^2$ is hydrogen, $R^5$ is an ethylene group, $R^6$ is hydrogen, $R^7$ is a tertiarybutyl radical and $R^1$ and $R^8$ are from linseed oil fatty acids.

3. The polymer of claim 1 in which the backbone is of methyl methacrylate and butyl methacrylate, $R^2$ is hydrogen, $R^5$ is an ethylene radical, $R^6$ and $R^7$ are ethyl groups and $R^1$ and $R^8$ are from tall oil fatty acids.

4. The polymer of claim 1 in which the backbone is methyl methacrylate, acrylonitrile and styrene, $R^2$ is hydrogen, $R^5$ is an ethylene group, $R^6$ is hydrogen, $R^7$ is a tertitarybutyl group and $R^1$ and $R^8$ are from linseed oil fatty acids.

5. The polymer of claim 1 in which the backbone is styrene and butyl methacrylate, $R^2$ is hydrogen, $R^5$ is an ethylene group, $R^6$ is hydrogen, $R^7$ is a tertiary butyl group, $R^1$ and $R^8$ are from linseed oil fatty acids.

6. The polymer of claim 1 in which the backbone is of methyl methacrylate and cyclohexyl methacrylate, $R^2$ is hydrogen, $R^5$ is an ethylene group, $R^6$ is hydrogen, $R^7$ is a tertiary butyl group, $R^1$ and $R^8$ are from linseed oil fatty acids.

7. The polymer of claim 1 in which the backbone is methyl methacrylate and 2-ethylhexyl methacrylate, $R^2$ is hydrogen, $R^5$ is an ethylene group, $R^6$ is hydrogen, $R^7$ is a tertiary butyl group, $R^1$ and $R^8$ are from linseed oil fatty acids.

8. A process for forming a polymer which comprises
(1) blending the following reactants
  (a) 3–35% by weight of a vinyloxazoline ester of the formula

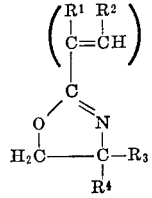

(b) 0.5–15% by weight of an alkyl amino acrylate of the formula

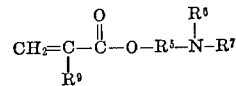

(c) 50–96.5% by weight of copolymerizable ethylenically unsaturated monomers selected from the group consisting of an alkyl methacrylate having 1–8 carbon atoms in the alkyl group, cyclohexyl methacrylate, acrylonitrile, styrene and mixtures thereof;
  (d) 0.01–2% by weight of a polymerization catalyst
(2) reacting the above prepared mixture at about 50–200° C. for about 1–6 hours to form a polymer wherein
$R^1$ is a hydrocarbon group having 2–20 carbon atoms;
$R^2$ is selected from the group consisting of hydrogen and an alkyl group having 1–4 carbon atoms;
$R^3$ and $R^4$ are

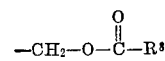

$R^5$ is an aliphatic hydrocarbon group having 1–6 carbon atoms;
$R^6$ and $R^7$ are individually selected from the group consisting of hydrogen, a saturated aliphatic hydrocarbon group having 1–6 carbon atoms;
$R^8$ is from drying oil fatty acids and
$R^9$ is selected from the group consisting of hydrogen and methyl.

9. A coating composition comprising 5–60% by weight of a polymer blend and 95–40% by weight of a solvent for the polymer blend in which the blend consists essentially of
(1) 1–95% by weight of an acrylic vinyl oxazoline ester polymer that has a relative viscosity of about 1.03–1.30 measured according to ASTM–D–445–46–T, Method B at 25° C. and which consists essentially of a backbone of 50–96% by weight, based on the weight of the polymer, of polymerized ethylenically unsaturated monomers selected from the group consisting of an alkyl methacrylate having 1-8 carbon atoms in the alkyl group, cyclohexyl methacrylate, acrylonitrile, styrene and mixtures of these monomers and containing in the backbone 3-35% by weight, based on the weight of the polymer, of polymerized vinyl oxazoline esters of the formula

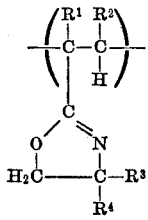

and having attached to the polymer backbone 0.5–15% by weight, based on the weight of the polymer, of pendent amino ester groups of the formula

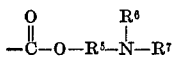

wherein $R^1$ is a hydrocarbon group having 2–20 carbon atoms;

$R^2$ is selected from the group consisting of hydrogen and an alkyl group having 1–4 carbon atoms;

$R^3$ and $R^4$ are

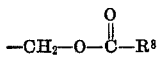

$R^5$ is an aliphatic hydrocarbon group having 1–6 carbon atoms;

$R^6$ and $R^7$ are individually selected from the group consisting of hydrogen, a saturated aliphatic hydrocarbon group having 1–6 carbon atoms; and $R^8$ is from drying oil fatty acids, and (2) 99–5% by weight of an alkyd resin or a blend of alkyd resins; wherein the alkyd resin is the esterification product of drying oil fatty acids, a polyhydric alcohol and an aromatic dicarboxylic acid or an anhydride thereof or a mixture of an aromatic dicarboxylic acid and an anhydride of an aromatic dicarboxylic acid.

10. The coating composition of claim 9 containing pigment in a pigment to binder ratio of about 1:100 to about 75:100.

11. The coating composition of claim 10 which consists essentially of 50–65% by weight of said acrylic vinyl oxazoline ester polymer and 50–35% by weight of an alkyd resin.

12. The coating composition of claim 11 in which the alkyd resin is an acrylic-alkyd resin.

13. The coating composition of claim 12 in which the acrylic portion of the acrylic-alkyd resin consists essentially of styrene, methyl methacrylate, methacrylic acid and in which the alkyd portion consists essentially of the esterification product of drying oil fatty acids, a polyhydric alcohol and an aromatic dicarboxylic acid or anhydride.

14. The coating composition of claim 11 in which the backbone of said vinyl oxazoline ester polymer is of an alkyl methacrylate in which the alkyl group has 1–8 carbon atoms, $R^1$ and $R^8$ are from drying oil fatty acids, $R^2$ is hydrogen, $R^5$ is a saturated aliphatic hydrocarbon group containing 2–4 carbon atoms, and $R^6$ and $R^7$ are individually selected from the group consisting of hydrogen and a saturated aliphatic hydrocarbon group containing 1–4 carbon atoms and in which the alkyd resin is the esterification product of a drying oil fatty acid, a polyhydric alcohol and an aromatic carboxylic acid or anhydride.

15. The coating composition of claim 14 in which the backbone of said vinyl oxazoline polymer is of butyl methacrylate and methyl methacrylate, $R^1$ and $R^8$ are from linseed oil fatty acids, $R^5$ is an ethylene group, $R^6$ is hydrogen, $R^7$ is a tertiary butyl radical, the alkyd resin is the esterification product of linseed oil fatty acids, benzoic acid, pentaerythritol and phthalic anhydride.

References Cited

UNITED STATES PATENTS

| | | | |
|---|---|---|---|
| 2,530,316 | 11/1950 | Rust et al. | 260—22 |
| 2,940,872 | 6/1960 | Gusman et al. | 117—75 |
| 2,940,950 | 6/1960 | Gusman | 260—32.8 |
| 2,964,483 | 12/1960 | Johnson et al. | 260—22 |
| 3,208,981 | 9/1965 | Miranda et al. | 260—78.5 |
| 3,247,174 | 4/1966 | Breitenbach et al. | 260—885 |
| 3,248,397 | 4/1966 | Purcell | 260—307 |
| 3,369,016 | 2/1968 | Bulbenko et al. | 260—239 |
| 3,382,294 | 5/1968 | Christenson et al. | 260—850 |
| 3,468,976 | 9/1969 | Yanai et al. | 260—883 |

DONALD E. CZAJA, Primary Examiner

R. W. GRIFFIN, Assistant Examiner

U.S. Cl. X.R.

117—75, 132, 161; 260—23, 32.8, 33.6, 40, 41, 80.72, 875, 876, 885